United States Patent
Park et al.

(10) Patent No.: US 8,737,762 B2
(45) Date of Patent: May 27, 2014

(54) METHOD FOR ENHANCING IMAGE EDGE

(75) Inventors: Soo Jin Park, Seoul (KR); Raghubansh B. Gupta, Bangalore (KR)

(73) Assignee: LG Innotek Co., Ltd., Seoul (KR)

( * ) Notice: Subject to any disclaimer, the term of this patent is extended or adjusted under 35 U.S.C. 154(b) by 235 days.

(21) Appl. No.: 13/214,610

(22) Filed: Aug. 22, 2011

(65) Prior Publication Data

US 2012/0328193 A1    Dec. 27, 2012

(30) Foreign Application Priority Data

Jun. 24, 2011   (KR) .................. 10-2011-0061589

(51) Int. Cl.
*G06K 9/40* (2006.01)

(52) U.S. Cl.
USPC ........................................................ 382/266

(58) Field of Classification Search
None
See application file for complete search history.

(56) References Cited

U.S. PATENT DOCUMENTS

| | | | |
|---|---|---|---|
| 6,625,326 B1* | 9/2003 | Cho | 382/266 |
| 7,046,837 B2* | 5/2006 | Guest et al. | 382/145 |
| 2005/0047660 A1* | 3/2005 | Tanaka | 382/176 |
| 2010/0066868 A1* | 3/2010 | Shohara | 348/241 |

* cited by examiner

*Primary Examiner* — Shefali Goradia
*Assistant Examiner* — Amandeep Saini
(74) *Attorney, Agent, or Firm* — Saliwanchik, Lloyd & Eisenschenk, P.A.

(57) ABSTRACT

Disclosed is a method for enhancing an image edge. An edge filter is applied to a photographed image, and the determination is performed with respect to whether pixels having edge possibility are noise or form an edge. The determination for the noise and the edge is performed once more with respect to pixels having vagueness for the noise and the edge by using a 3×3 mask. An edge enhancement process is performed through a simple algorithm.

5 Claims, 2 Drawing Sheets

METHOD FOR ENHANCING IMAGE EDGE

CROSS-REFERENCE TO RELATED APPLICATION

This application claims the benefit under 35 U.S.C. §119 of Korean Patent Application No. 10-2011-0061589, filed on 24 Jun. 2011, which is hereby incorporated by reference in its entirety.

BACKGROUND

The embodiment relates to a method for enhancing an image edge.

In general, a scheme of enhancing image sharpness or a scheme of enhancing an image edge is to emphasize an edge (outline) of an image. A scheme of emphasizing an image edge to enhance image sharpness according to the related art includes a scheme of applying one 2D HPF (2D high pass filter) to the whole original image, so that the results are applied to an original image and a scheme of detecting the features of image edges (outlines) and applying various 2D high pass filters according to the features so that the results are applied to an original image.

According to the scheme of enhancing the image edges of the related art, when the image edges are enhanced, noise components may be increased as the image edges are enhanced.

Accordingly, the image edges must be enhanced while distinguishing noise components from the image edges through more effective and simpler algorithms.

BRIEF SUMMARY

The embodiment provides a method for applying edge enhancement with respect to only image edges while distinguishing edges from noise.

The technical objects of the present embodiment are not limited to the above object, and other technical objects will be clearly recognized by those skilled in the art to which the embodiment suggested in the following description pertains.

According to the embodiment, the method for enhancing an image edge includes receiving RGB data, converting the RGB data into YCbCr data, extracting an edge value by performing an edge filtering process with respect to a Y channel of the YCbCr data, determining vagueness of the extracted edge value for an edge and noise, applying an N×N (N is an integer number) mask to a pixel corresponding to the edge value and calculating a maximum value, a minimum value, and a mean value based on the N×N mask if the extracted edge value has the vagueness for the noise and the edge, determining if the pixel corresponding to the edge value is the edge or the noise by using the maximum value, the minimum value, and the mean value, and performing an edge enhancement process with respect to the pixel corresponding to the edge value if the pixel is determined as the edge.

DETAILED DESCRIPTION

Figure 1:
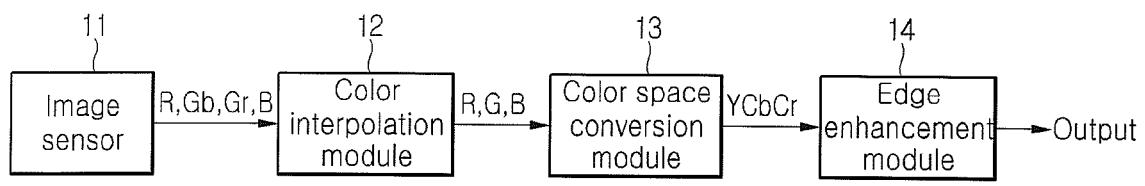
FIG. 1 is a block diagram showing an image processing apparatus according to one embodiment.

The embodiment may have various modifications, and various embodiments may be provided. Hereinafter, a specific embodiment is illustrated in accompanying drawings and will be described with reference to accompanying drawings.

However, the embodiment is not limited to the specific embodiment, but the embodiment includes all modifications, equivalents, and substitutes belonging to the technical scope of the embodiment without departing from the spirit of the embodiment.

Although terms "first" and "second" are used to describe various components, the components should not be limited to the terms. The terms "first" and "second" are used to distinguish similar elements from each other. Accordingly, a first part may be named by a second part without departing from the spirit of the embodiment. Similarly, the second part may be named by the first part. A term "and/or" represents the combination of a plurality of items or one of the items.

Hereinafter, exemplary embodiments will be described in more detail with reference to accompanying drawings. In the following description, for the illustrative purpose, the same components will be assigned with the same reference numerals, and the repetition in the description about the same components will be omitted in order to avoid redundancy.

The preset embodiment relates to a method for enhancing an image edge. In more detail, the present embodiment, an edge filter is applied to a photographed image, and a process of determining whether pixels having edge possibility are noise components or edge components is first performed. Pixels, which cannot be determined as the noise components or the edge components, are subject to a process of determining whether the pixels are noise components or edge components by using a 3×3 mask. According to the present embodiment, the edge enhancement can be performed through a simple algorithm.

The embodiments will be described in more detail with reference to accompanying drawings.

FIG. 1 is a block diagram showing an image processing apparatus 10 according to one embodiment.

As shown in FIG. 1, the image processing apparatus 10 according to one embodiment may include an image sensor 11 used to photograph an image, a color interpolation module 12 to convert raw data output from the image sensor 11 to RGB data, a color space conversion module 13 to convert the RGB data into YCbCr data, and an edge enhancement module 14 to perform edge enhancement with respect to Y channel data of the YCbCr data. Data output from the edge enhancement module 14 may be directly output to a display or may be output to the display through an additional process of a noise reduction module or a color compression part.

In addition to the elements shown in FIG. 1, the image processing apparatus 10 may further include a pre-process module to perform pre-processes such as a digital clamp process, a white detect correction process, a pattern generation process, and an RGB shading process with respect to the data output from the image sensor 11.

In more detail, the color interpolation module 12 performs an interpolation scheme to divide an individual pixel component having one channel component into R (Red), G (Green), and B (Blue) components, and to combine the R, G, and B components, thereby creating image data having pixels, each of which has R, G, and B channel components.

The edge enhancement module 14 detects edges of image data through a later-described scheme to enhance the image edge, so that the sharpness of the image can be improved.

Figure 2:
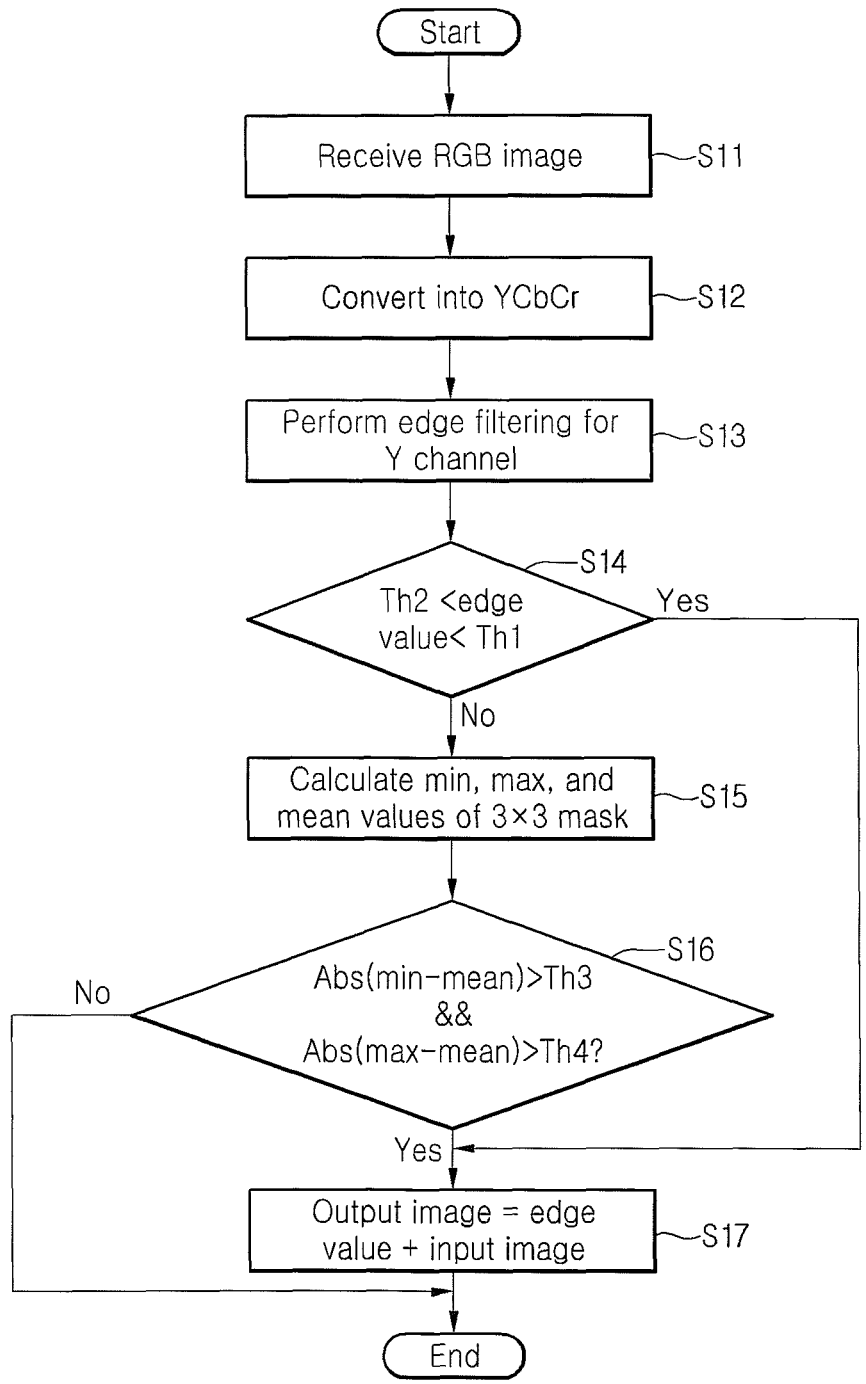
FIG. 2 is a flowchart showing a method for improving an image edge according to one embodiment.

FIG. 2 is a flowchart showing a method for enhancing the image edge according to one embodiment.

In step S11, RGB image data are received. The RGB image data may be photographed through the image sensor 11, or may be received from another device or read-out from storage media. If the RGB image data are obtained through the image sensor 11, the raw data photographed through the image sensor 11 of FIG. 1 may be converted into the RGB image data by the color interpolation module 12.

In step S12, the RGB image data are converted into YCbCr data. The conversion into the YCbCr data may be performed through the color space conversion module 13 of FIG. 12.

The following steps may be performed by the edge enhancement module 14 of FIG. 1. In step S13, edge filtering is performed with respect to the Y channel data of YCbCr data, so that pixels corresponding to edges can be extracted.

In this case, the edge filtering may be performed through various edge detection algorithms generally well known in the art. For example, a Standard Laplacian Kernel may be performed.

The edge filtering is to filter image edges (outlines). However, since noise components may represent features similar to those of the edges, the noise components may be extracted as pixels corresponding to the edges.

In step S14, the noise components are removed primarily. In this case, an edge value, that is, the brightness value of a pixel corresponding to the edge is determined if the brightness value is in the predetermined range, for example, if the brightness value is between the first and second threshold values Th1 and Th2, so that it is determined if the pixel is a noise or an edge.

The first and second threshold values Th1 and Th2 may vary according to embodiments, or may be adaptively set to different values according to the features of the image.

If the edge value of the relating pixel is in the range of the first and second threshold values Th1 and Th2, the pixel is determined as an edge pixel, and the edge enhancement is performed with respect to the edge pixel.

The edge enhancement in step S17 is performed by adding the edge value to an input original image value. In addition, various schemes may be used for the purpose of edge enhancement.

If the edge value of the pixel gets out of the range of the first and second threshold values Th1 and Th2, the pixel is regarded as a pixel having the possibility of a noise, so that the pixel is subject to a process of determining if the pixel is a noise or an edge again.

In step S15, an N×N (N is an integer number) mask is set around the relating pixel, and a minimum value, a maximum value, and a mean value of pixels belonging to the mask are calculated. The N to determine the size of the mask may vary according to the embodiments. Preferably, the size of the mask is 3×3 or 5×5.

In step S16, if the absolute value of (the minimum value-the maximum value) is greater than or equal to a third threshold value Thr3, and if the absolute value of (the minimum value-the maximum value) is greater than or equal to a fourth threshold value Thr4, the pixel is determined as the edge. Otherwise, the pixel is determined as the noise.

If the pixel is determined as the edge, the pixel is subject to the edge enhancement in step S17. If the pixel is determined as the noise, the procedures are repeatedly performed with respect to the next pixel.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for enhancing an image edge, the method comprising:
    (a) receiving RGB image data;
    (b) converting the RGB image data into YCbCr data;
    (c) extracting a first pixel by performing an edge filtering process with respect to Y channel data of the YCbCr data;
    (d) determining whether a brightness value corresponding to the first pixel is between a first and a second threshold values;
    (e) applying an N×N (N is an integer number) mask to the first pixel and calculating a maximum value, a minimum value, and a mean value of pixels belonging to the N×N mask if the brightness value is determined to be not between the first and the second threshold values;
    (f) determining whether a first absolute difference between the minimum value and the mean value is greater than or equal to a third threshold value and whether a second absolute difference between the maximum value and the mean value is greater than or equal to a fourth threshold value; and
    (g) performing an edge enhancement process with respect to the first pixel according to results of the determination of (f);
    wherein the first pixel is determined to be on an edge if the brightness value is determined to be between the first and the second threshold values or the first absolute difference is determined to be greater than or equal to the third threshold value and if the second absolute difference is determined to be greater than or equal to the fourth threshold value.

2. The method of claim 1, wherein the edge filtering process is performed by a Standard Laplacian Kernel.

3. The method of claim 1, wherein N is 3 or 5.

4. The method of claim 1, further comprising:
    performing (a)-(g) with respect to a second pixel if the first pixel is determined to be not on the edge based on the minimum value, the maximum value, and the mean value.

5. The method of claim 1, wherein the performing the edge enhancement process comprises adding an edge value to an input image.

* * * * *